United States Patent
Fuller et al.

(10) Patent No.: US 7,945,338 B2
(45) Date of Patent: May 17, 2011

(54) AUTOMATION HUMAN MACHINE INTERFACE HAVING VIRTUAL GRAPHIC CONTROLS

(75) Inventors: Bruce Gordon Fuller, Edmonton (CA); Brian Alexander Wall, White Rock (CA); Kevin George Gordon, Vancouver (CA); Mark David Hobbs, Hartford, WI (US); Mohamed Salehmohamed, Surrey (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 520 days.

(21) Appl. No.: 12/041,479

(22) Filed: Mar. 3, 2008

(65) Prior Publication Data

US 2009/0222113 A1    Sep. 3, 2009

(51) Int. Cl.
*G06F 19/00* (2011.01)
(52) U.S. Cl. ...................................... 700/17; 340/691.1
(58) Field of Classification Search ............... 700/17, 700/83, 97; 717/735, 771, 765, 460, 772; 340/691.1, 584, 691.6
See application file for complete search history.

(56) References Cited

U.S. PATENT DOCUMENTS

| | | | |
|---|---|---|---|
| 6,411,987 B1* | 6/2002 | Steger et al. | 709/203 |
| 6,505,247 B1* | 1/2003 | Steger et al. | 709/224 |
| 6,757,568 B2* | 6/2004 | Birzer et al. | 700/18 |
| 2002/0070922 A1* | 6/2002 | Zarek | 345/168 |
| 2003/0174169 A1* | 9/2003 | Tiwari et al. | 345/764 |
| 2006/0095855 A1* | 5/2006 | Britt et al. | 715/760 |
| 2006/0241793 A1* | 10/2006 | Skourup et al. | 700/83 |
| 2006/0277461 A1* | 12/2006 | Britt et al. | 715/513 |
| 2007/0162906 A1* | 7/2007 | Chandhoke | 718/100 |

* cited by examiner

*Primary Examiner* — Kidest Bahta
(74) *Attorney, Agent, or Firm* — Setter Roche LLP; Alexander B. Kuszewski; John M. Miller

(57) ABSTRACT

Within an industrial automation environment, a human-machine interface (HMI) is provided comprising a HMI computer, a display electrically coupled with the computer, and a controller wirelessly coupled with the computer. The controller is configured to detect motion of the controller, and wirelessly transmit motion data related to the motion of the controller to the HMI computer. The HMI computer is configured to receive industrial automation data, wirelessly receive motion data from the controller, process the motion data into control data, and select a first set of industrial automation data for display in response to the control data.

15 Claims, 5 Drawing Sheets

AUTOMATION HUMAN MACHINE INTERFACE HAVING VIRTUAL GRAPHIC CONTROLS

OVERVIEW

Industrial environments may include a variety of industrial equipment controlled by a control computer. The control computer may be in communication with a computer configured to act as a human-machine interface (HMI), allowing a user to monitor and control operation of the industrial equipment. The HMI computer may include a display configured to graphically represent status and current operation of the equipment and provide graphical controls allowing a user to control the equipment. Some displays include touch screens allowing a user to control operation of the equipment through the touch screen interface. Other configurations may provide the user with a keyboard and mouse for entering control information to the computer. However, many industrial environments are harsh, dirty, and noisy; often including audio noise, physical vibrations, and both liquid and solid contaminants. These environments may be very rough on computer equipment, requiring the use of very rugged equipment to avoid excessive damage and downtime.

TECHNICAL SUMMARY

Within an industrial automation environment, a human-machine interface (HMI) is provided comprising a HMI computer, a display electrically coupled with the HMI computer, and a controller wirelessly coupled with the HMI computer. The controller is configured to detect motion of the controller, and wirelessly transmit motion data related to the motion of the controller to the HMI computer. The HMI computer is configured to receive industrial automation data, wirelessly receive motion data from the controller, process the motion data into control data, and select a first set of industrial automation data for display in response to the control data.

In another embodiment, a method of controlling a human-machine interface (HMI) in an industrial automation environment comprises detecting a motion of a controller, wirelessly transmitting motion data indicating the motion from the controller to a HMI computer, processing the motion data resulting in control data, selecting a set of industrial automation data based on the control data, and graphically displaying the set of industrial automation data.

In a further embodiment, a computer-readable medium having instructions stored thereon for operating a human-machine interface (HMI) computer in an industrial automation environment is provided. The instructions when executed by the HMI computer, direct the HMI computer to receive industrial automation data, wirelessly receive motion data from a controller, process the motion data into control data, and select a first set of industrial automation data for display in response to the control data.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
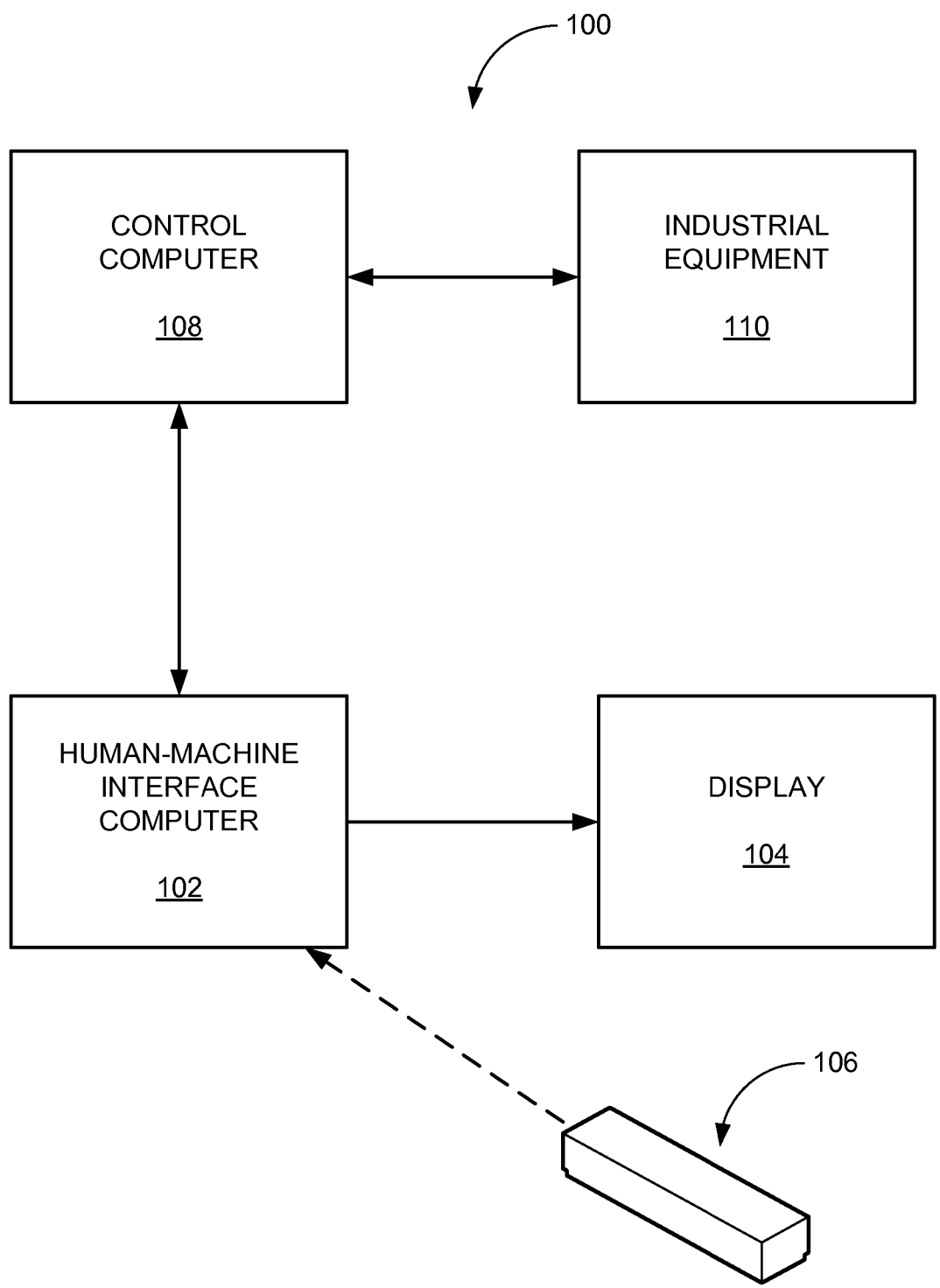
FIG. 1 is a block diagram illustrating an industrial automation system.

FIG. 1 is a block diagram illustrating an industrial automation system. In this example industrial automation system 100, wireless controller 106 is wirelessly coupled to human-machine interface (HMI) computer 102. HMI computer 102 is coupled to control computer 108, which is in turn coupled to industrial equipment 110. HMI computer 102 is configured to drive display 104 to graphically display industrial automation data related to industrial equipment 110. In an industrial automation environment, control computer 108 is configured to control industrial equipment 110, and to receive industrial automation data from industrial equipment 110. This industrial automation data is then transferred to HMI computer 102 where it is processed and configured for graphical representation on display 104. Wireless controller 106 is configured to interact with HMI computer 102 in selecting a set of industrial automation data for graphical representation on display 104. For example, wireless controller 106 may be configured to control which specific machines within industrial equipment 110 are selected for graphical representation and control by HMI computer 102. HMI computer 102 is configured to send machine control data to control computer 108 directing control computer 108 how to control industrial equipment 110. This machine control data may be selected or configured based on motion data received from wireless controller 108.

Figure 2:
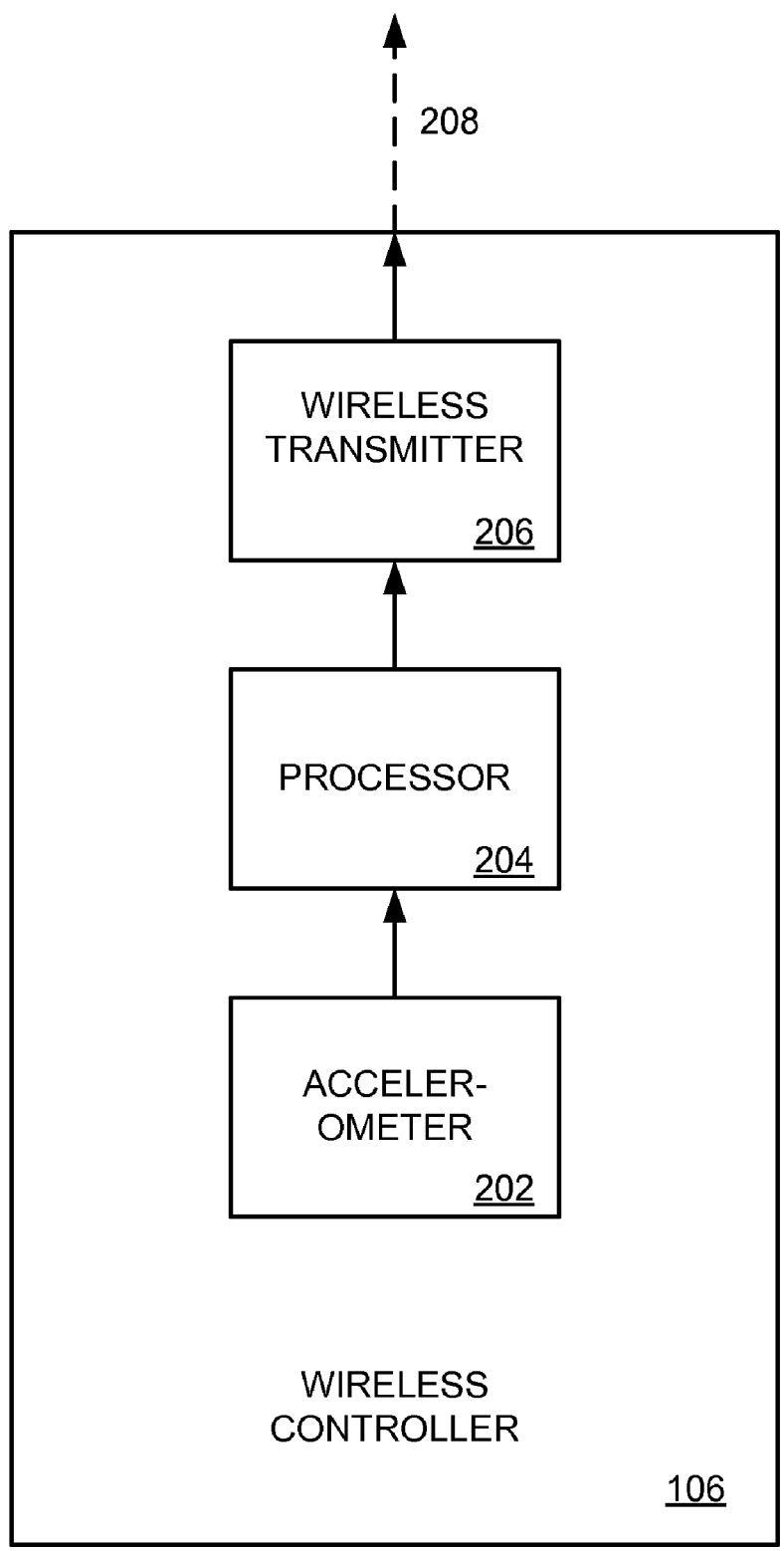
FIG. 2 is a block diagram illustrating a wireless controller within an industrial automation system.
Figure 3:
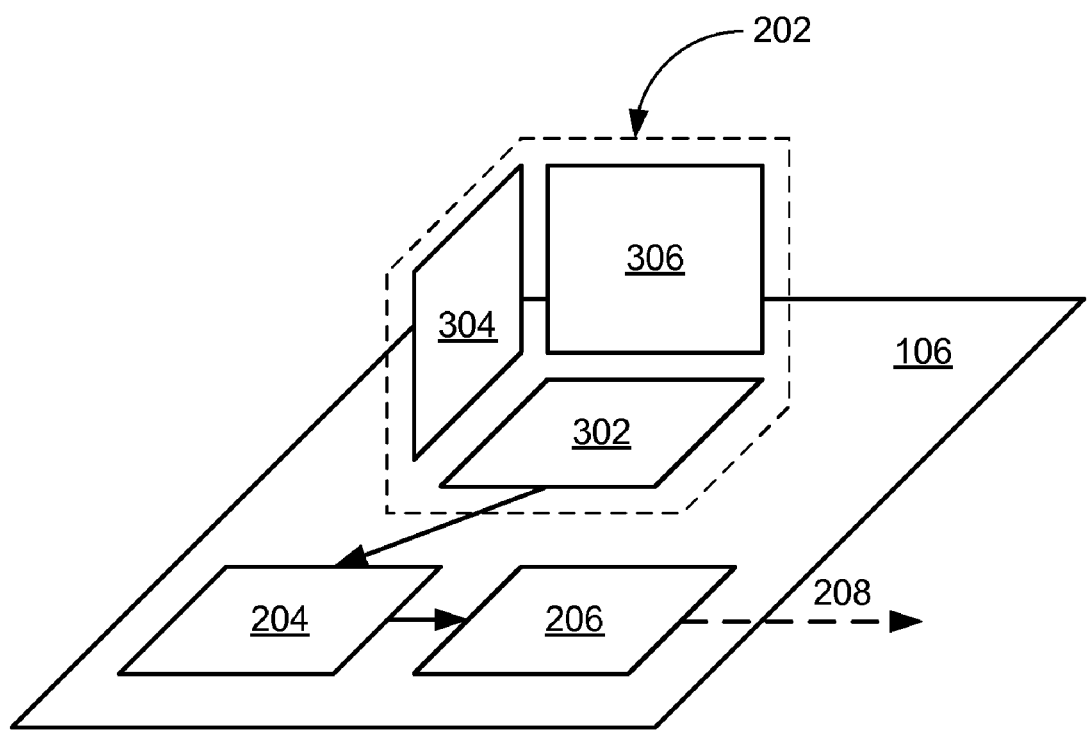
FIG. 3 is a perspective view block diagram illustrating a wireless controller within an industrial automation system.

FIG. 2 is a block diagram illustrating a wireless controller 102 within an industrial automation system 100. In this example, wireless controller 102 comprises accelerometer module 202, processor 204, and wireless transmitter 206. Accelerometer module 202 contains one or more accelerometers. In some embodiments, accelerometer module 202 contains three accelerometers positioned perpendicularly with each other as illustrated in FIG. 3 and described below. Accelerometer module 202 is coupled with processor 204, which in turn is coupled with wireless transmitter 206. Acceleration data is sent from accelerometer module 202 to processor 204 where it is converted to motion data. In some embodiments, the acceleration data is sent to processor 204 as an analog signal where it is then converted to a digital signal using an analog-to-digital converter within processor 204. Motion data is sent from processor 204 to wireless transmitter 206 where it is transmitted to a computer system over a wireless signal 208. Other embodiments not convert the acceleration data to motion data, but instead transmit the raw acceleration data to the computer system. Processor 204 may be any of a wide variety of possible processing systems such as a microprocessor, a microcontroller, or any other electronic circuit capable of performing processing tasks. Wireless transmitter 206 may be coupled with an external computer through any wireless signal 208, such as infrared or radio frequency (RF) signals.

FIG. 3 is a perspective view block diagram illustrating a wireless controller 106 within an industrial automation system 100. In this embodiment, wireless controller 106 includes an accelerometer module 202 comprising three accelerometers 302, 304, and 306 placed perpendicularly to each other. This enables accelerometer module 202 to capture acceleration data in each of three dimensions. This acceleration data is then sent to processor 204 where it may be converted to motion data. Motion data is then sent from processor 204 to wireless transmitter 206 for transfer to a computer through wireless signal 208.

Figure 4:
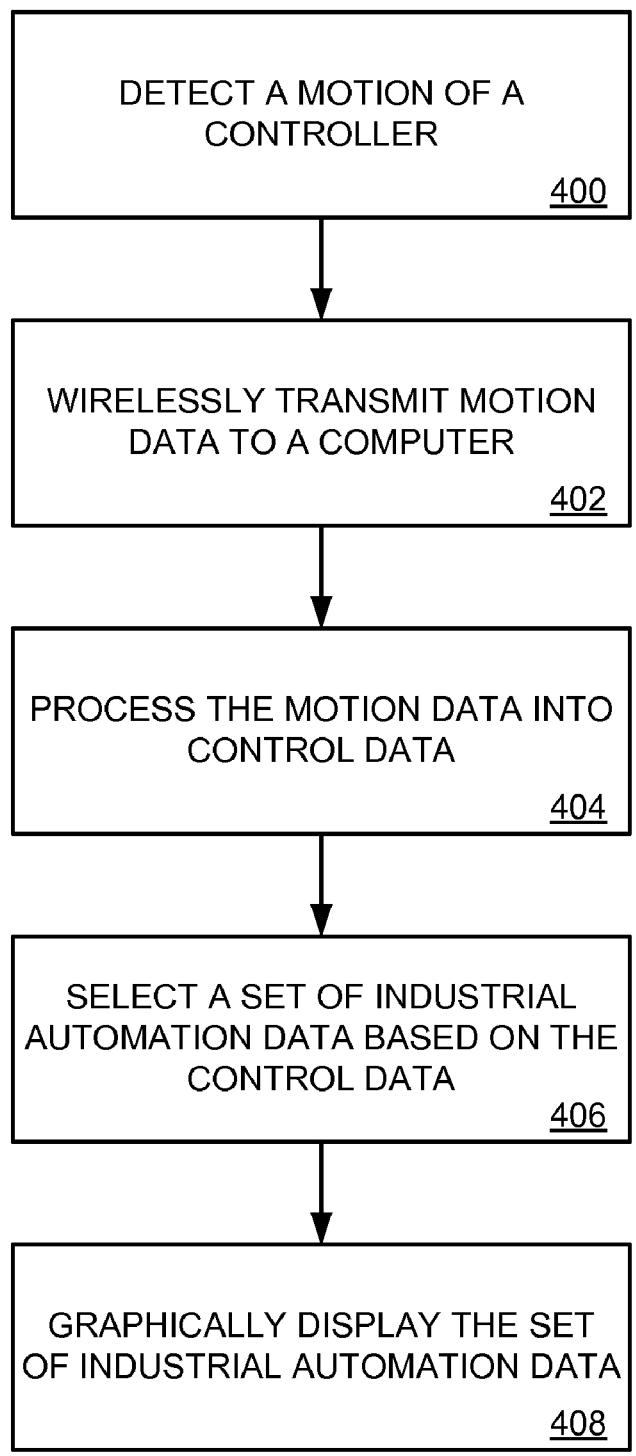
FIG. 4 is a flow diagram illustrating a method of operating an industrial automation system including a wireless controller.

FIG. 4 is a flow diagram illustrating a method of operating an industrial automation system 100 including a wireless controller 106. Reference numbers for FIG. 4 are indicated parenthetically below. Wireless controller 106 detects a motion using accelerometer module 202, (operation 400). Wireless controller 106 then wirelessly transmits motion data to HMI computer 102, (operation 402). HMI computer 102 then processes the motion data into control data, (operation 404). This processing may take any of a wide variety of forms. For example, the motion data may be used to select one or more sets of industrial automation data from industrial equipment 110. In some embodiments, when the motion data exceeds a motion threshold, HMI computer 102 may be configured to select a second set of industrial automation data. These sets of data may be related to specific machines, operations, or locations within industrial equipment 110. HMI computer 102 uses the control data to select a set of industrial automation data, (operation 406), and graphically displays the selected set of industrial automation data on display 104, (operation 408).

Figure 5:
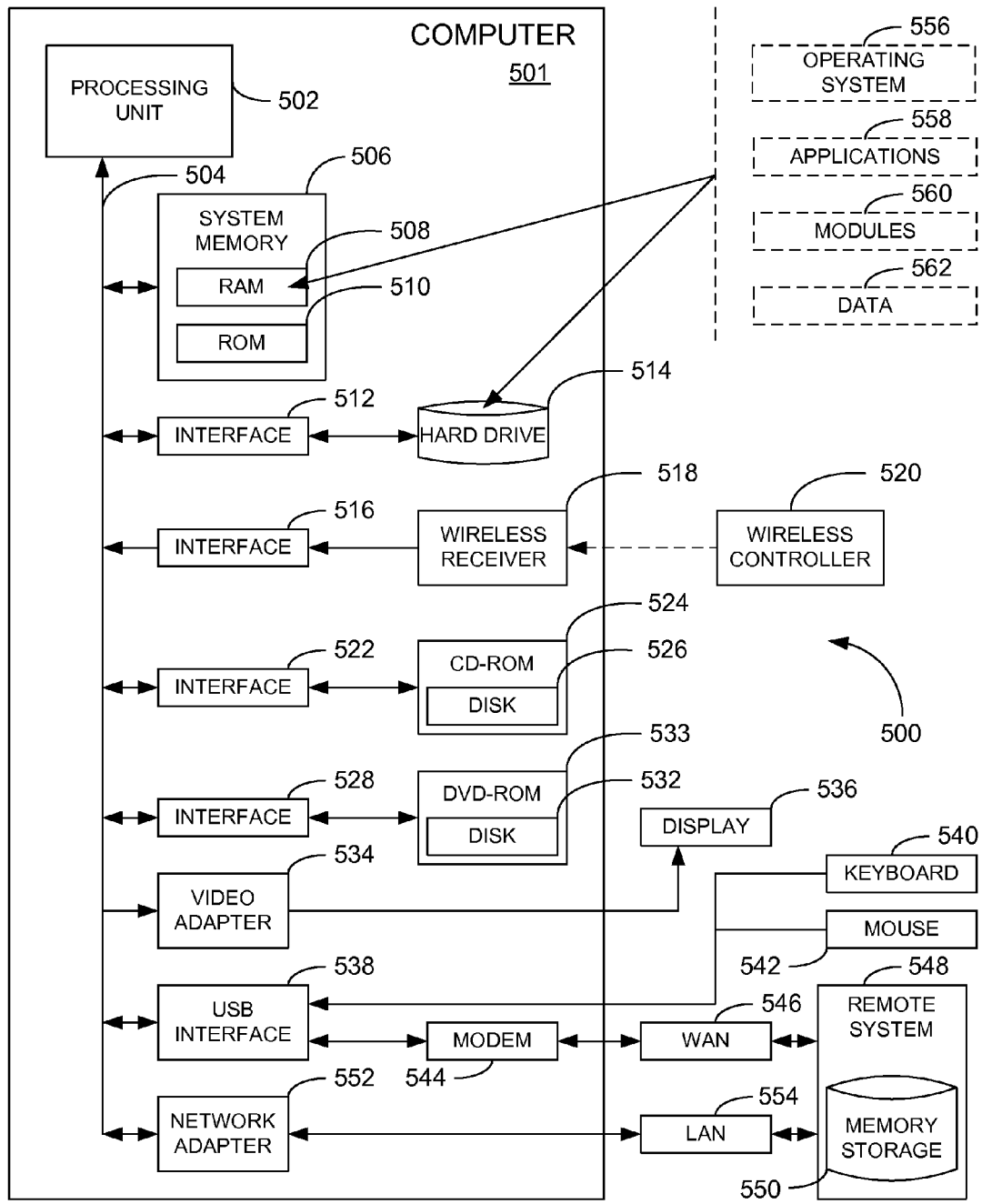
FIG. 5 is a block diagram illustrating a computer system including a computer configured as a human-machine interface computer.

FIG. 5 is a block diagram illustrating a computer system 500 including a computer 501 configured as a human-machine interface (HMI) computer 102, such as that illustrated in FIG. 1. Computer system 500 includes computer 501 which in turn includes processing unit 502, system memory 506, and system bus 504 that couples various system components including system memory 506 to processing unit 502. Processing unit 502 may be any of a wide variety of processors or logic circuits, including the Intel X86 series, Pentium, Itanium, and other devices from a wide variety of vendors. Processing unit 502 may include a single processor, a dual-core processor, a quad-core processor or any other configuration of processors, all within the scope of the present invention. Computer 501 could be comprised of a programmed general-purpose computer, although those skilled in the art will appreciate that programmable or special purpose circuitry and equipment may be used. Computer system 500 may be distributed among multiple devices that together comprise elements 502-562.

There are a wide variety of system bus 504 architectures, such as PCI, VESA, Microchannel, ISA, and EISA, available for use within computer 501, and in some embodiments multiple system buses may be used within computer 501. System memory 506 includes random access memory (RAM) 508, and read only memory (ROM) 510. System ROM 510 may include a basic input/output system (BIOS), which contains low-level routines used in transferring data between different elements within the computer, particularly during start-up of the computer. System memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, system memory 506 may incorporate electronic, magnetic, optical, and/or other types of storage media. Note that system memory 506 can have a distributed architecture, where various components are situated remote from one another, but can be accessed by processing unit 502.

Processing unit 502 receives software instructions from system memory 506 or other storage elements and executes these instructions directing processing unit 502 to operate in a method as described herein. These software instructions may include operating system 556, applications 558, modules 560, utilities, drivers, networking software, and data 562. Software may comprise firmware, or some other form of machine-readable processing instructions.

Computer 501 also includes hard drive 514 coupled to system bus 504 through hard drive interface 512, floppy drive 518 containing floppy disk 520 coupled to system bus 504 through floppy drive interface 516, CD-ROM drive 524 containing CD-ROM disk 526 coupled to system bus 504 through CD-ROM drive interface 522, and DVD-ROM drive 533 containing DVD-ROM disk 532 coupled to system bus 504 through DVD-ROM drive interface 528. There are a wide variety of other storage elements, such as flash memory cards and tape drives, available for inclusion in computer 501, which may be coupled to system bus 504 through a wide variety of interfaces. Also, these storage elements may be distributed among multiple devices, as shown here, and also may situated remote from each other, but can be accessed by processing unit 502.

Computer 501 also includes video adaptor 534 configured to drive display 536, and universal serial bus (USB) interface 538 configured to receive user inputs from keyboard 540 and mouse 542. Other user interfaces could comprise a voice recognition interface, microphone and speakers, graphical display, touch screen, game pad, scanner, printer, or some other type of user device. These user interfaces may be distributed among multiple user devices. USB interface 538 is also configured to interface with modem 544 allowing communication with remote system 548 through a wide area network (WAN) 546, such as the internet. USB interface 538 and network adaptor 552 may be configured to operate as input ports capable of receiving industrial automation data from control computer 108, and capable of sending machine control data to control computer 108 for use in controlling industrial equipment 110.

Computer 501 further includes network adaptor 552 configured to communicate to remote system 548 through a local area network (LAN) 545. There are a wide variety of network adaptors 552 and network configurations available to allow communication with remote systems 548, and any may be used in other embodiments. For example, networks may include Ethernet connections or wireless connections. Networks may be local to a single office or site, or may be as broad and inclusive as the Internet or Usenet. Remote systems 548 may include memory storage 550 in a very wide variety of configurations.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A human-machine interface (HMI) in an industrial automation environment, the HMI comprising:
    an HMI computer;
    a display electrically coupled with the HMI computer; and
    a controller wirelessly coupled with the HMI computer;
    wherein the controller comprises:
        at least one accelerometer configured to detect acceleration of the controller and output acceleration data;
        a processor coupled with the at least one accelerometer and configured to process the acceleration data into motion data related to motion of the controller and output the motion data; and
        a transmitter coupled with the processor and configured to wirelessly transmit the motion data related to the motion of the controller to the HMI computer; and
    wherein the HMI computer is configured to:
        receive industrial automation data;
        wirelessly receive the motion data from the controller;
        process the motion data into control data; and
        select a first set of industrial automation data for display by the display in response to the control data.

2. The HMI of claim 1, wherein the processor comprises an analog-to-digital converter.

3. The HMI of claim 1, wherein the controller comprises three accelerometers configured at substantially right angles to each other, wherein the three accelerometers include the at least one accelerometer.

4. The HMI of claim 1, wherein the HMI computer is configured to transmit a second set of industrial automation data to the display when the motion data exceeds a motion threshold.

5. The HMI of claim 4, wherein the first set of industrial automation data comprises data related to a first machine, and wherein the second set of industrial automation data comprises data related to a second machine.

6. The HMI of claim 1, wherein the HMI computer further comprises:
    a wireless receiver configured to receive wireless data from the controller, and wherein the wireless data comprises the motion data.

7. The HMI of claim 1, wherein the HMI computer further comprises:
    an input port configured to receive the industrial automation data from at least one machine.

8. The HMI of claim 1, wherein the HMI computer further comprises:
    an output port configured to transmit machine control data to at least one machine.

9. The HMI of claim 8, wherein the HMI computer is configured to transmit the machine control data to the at least one machine in response to the motion data received from the controller.

10. A method of controlling a human-machine interface (HMI) in an industrial automation environment, the method comprising:
    in at least one accelerometer, detecting an acceleration of a controller;
    in a processor coupled to the accelerometer, generating motion data related to motion of the controller based on the acceleration;
    wirelessly transmitting the motion data related to the motion of the controller to a computer;
    processing the motion data to generate control data;
    selecting a set of industrial automation data based on the control data; and
    graphically displaying the set of industrial automation data.

11. The method of claim 10, further comprising:
    receiving first industrial automation data from a first machine;
    graphically displaying the first industrial automation data;
    receiving second industrial automation data from a second machine; and
    graphically displaying the second industrial automation data based on the control data.

12. The method of claim 11, wherein the acceleration is detected by three accelerometers configured at substantially right angles to each other within the controller, wherein the three accelerometers include the at least one accelerometer.

13. A computer-readable medium having instructions stored thereon for operating an industrial automation system comprising a controller and a human-machine interface (HMI) computer in an industrial automation environment, wherein the instructions when executed by the industrial automation system, direct the industrial automation system to:
    in the controller:
    upon detection of acceleration by an accelerometer, process acceleration data corresponding to the acceleration to produce motion data related to motion of the controller, and wirelessly transmit the motion data from the controller to the HMI computer; and in the HMI computer:
receive industrial automation data;
wirelessly receive the motion data from the controller;
process the motion data into control data; and
select a first set of the industrial automation data for display in response to the control data.

14. The computer-readable medium of claim 13, having further instructions directing the HMI computer to select a second set of the industrial automation data for display when the motion data exceeds a motion threshold.

15. The computer-readable medium of claim 14, wherein the first set of the industrial automation data comprises data related to a first machine, and wherein the second set of the industrial automation data comprises data related to a second machine.

* * * * *